United States Patent [19]

Jackson

[11] 4,286,770

[45] Sep. 1, 1981

[54] DEFORMABLE PLUG

[75] Inventor: Alan D. Jackson, Hutchinson, Kans.

[73] Assignee: The Cessna Aircraft Company, Wichita, Kans.

[21] Appl. No.: 126,609

[22] Filed: Mar. 3, 1980

[51] Int. Cl.³ .................... F16K 51/00

[52] U.S. Cl. .................... 251/285

[58] Field of Search .................... 251/285; 151/37, 41.72

[56] References Cited

U.S. PATENT DOCUMENTS

| | | | |
|---|---|---|---|
| 1,923,647 | 8/1933 | Vera | 151/37 |
| 2,905,198 | 9/1959 | Peeps et al. | 251/285 |
| 3,012,751 | 12/1961 | Hauser | 251/285 |
| 3,314,646 | 4/1967 | Austin | 251/285 |
| 3,511,469 | 5/1970 | Bell | 251/285 |
| 3,834,269 | 9/1974 | Ohringer | 151/37 |
| 3,989,113 | 11/1976 | Springs, Sr. et al. | 251/285 |
| 4,099,703 | 7/1978 | Lush | 251/285 |
| 4,200,596 | 4/1980 | Iiyama et al. | 251/285 |

FOREIGN PATENT DOCUMENTS

| | | | |
|---|---|---|---|
| 1210963 | 11/1970 | United Kingdom | 151/37 |

*Primary Examiner*—H. Jay Spiegel
*Attorney, Agent, or Firm*—Edward L. Brown, Jr.

[57] ABSTRACT

A removable plug used for setting land timming of a control valve spool or spring loading in relief valves. The plug has deflectable contact points which deform in its plastic range against the harder surface of the valve body as the plug is screwed into the valve body to position the spool for precise and repeatable land timming.

11 Claims, 7 Drawing Figures

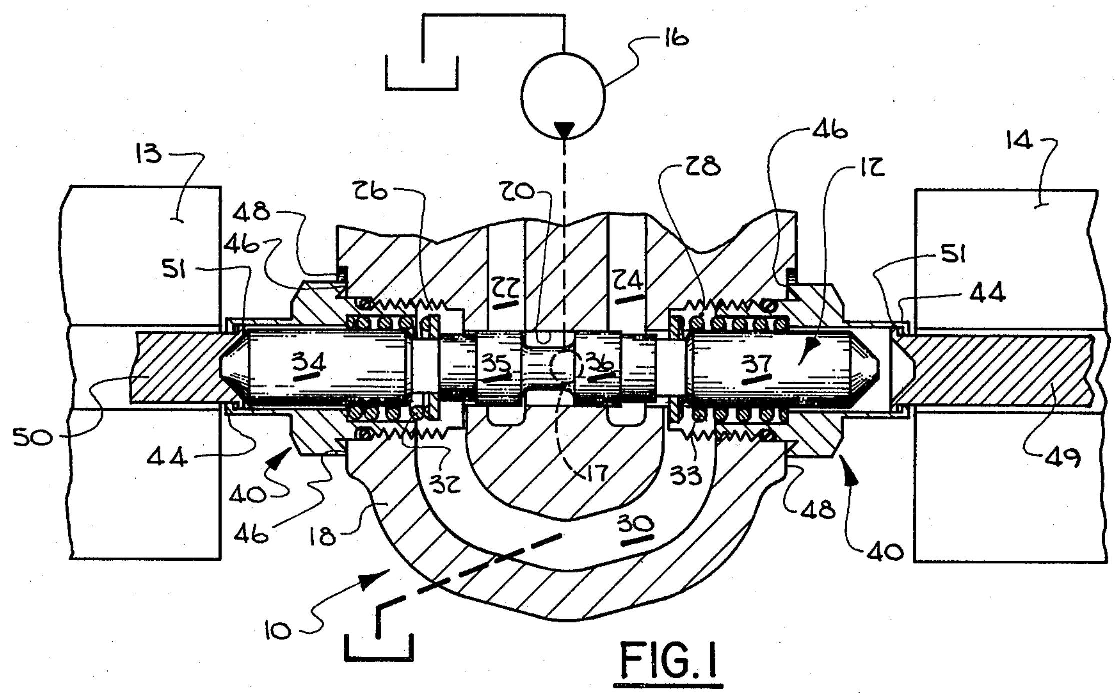
FIG. 1
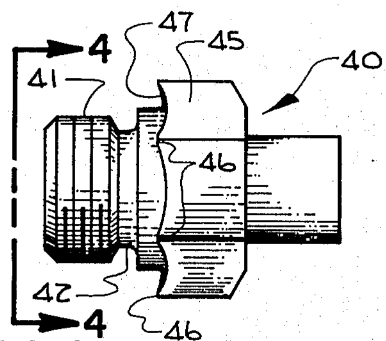
FIG. 2
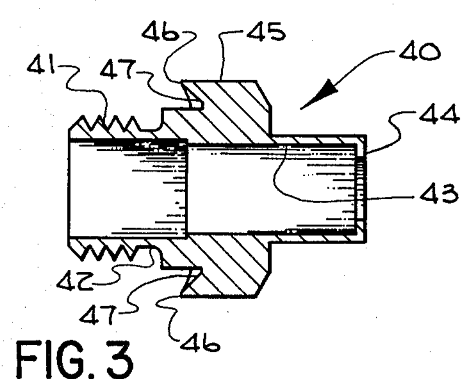
FIG. 3
FIG. 4
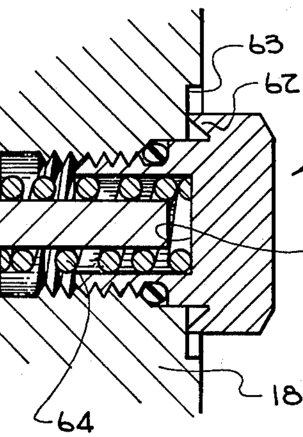
FIG. 5

DEFORMABLE PLUG

BACKGROUND OF THE INVENTION

In the hydraulic art, the techniques of shimming control valve spools and relief valve springs has long existed. In certain directional control valve applications, it is necessary that the valve spool pass a specific flow rate in a certain position. Due to the various tolerances in the spool and valve body, it is quite often necessary to shim so that at a certain position of the spool, the flow rate is in accordance with the design parameters of the valve. To achieve this in the past, the valve had to be disassembled once on a test stand and shims added. The valve was then checked for a second time to insure the proper flow rate, all of which is very time-consuming and expensive.

With the present invention, the spool stop is formed by an end plug which is formed of a relatively soft material. The plug is screwed into the valve body causing the contact points on the plug to deform above their elastic limit to a point where the designed flow rate is set. This avoids the necessity of removing the plug and inserting shims. In addition, the plug of the present invention may be removed in the field after it has been set at the factory, and reinstalled to a lower factory-recommended torque value which will return the plug within tolerance levels of its original setting, since this lower torque value will not cause the deformed portion of the plug to exceed the elastic limit.

It is therefore the principal object of the present invention to provide a valve spool end plug having deformable contact points for setting the spool flow rates, which plug can be removed and reinstalled in the field while retaining factory settings within original tolerance levels.

Another object of the present invention is to provide a deformable plug which functions as a variable size shim to vary spring loadings on relief valves or valve spool positions.

Other features and advantages of the present invention will become more apparent from the following description, appended claims and drawings.

BRIEF DESCRIPTION OF THE DRAWINGS

FIG. 1 is a longitudinal section of a solenoid operated control valve with the end plug of the present invention shown at both ends of the valve;

FIG. 2 is a side elevational view of the plug;

FIG. 3 is a longitudinal section through the plug taken along lines 3—3 of FIG. 4;

FIG. 4 is a left end view of the plug taken along lines 4—4 of FIG. 2;

FIG. 5 is a longitudinal section of a modified form of the plug of the present invention;

DESCRIPTION OF THE PREFERRED EMBODIMENT

Figure 6:
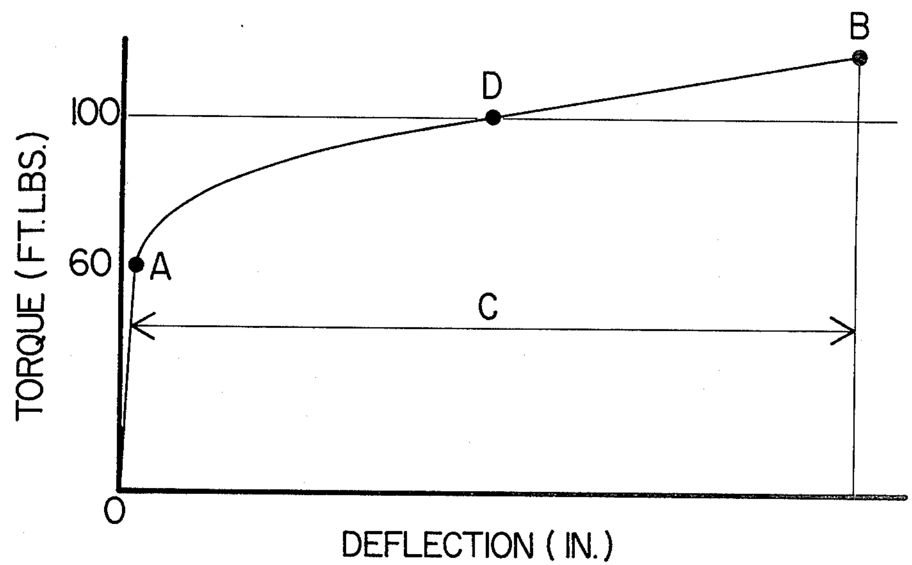
FIG. 6 is a curve plotting the torque required versus the deflection of the plug.

FIG. 1 illustrates a solenoid operated three-position four-way control valve generally described by reference numeral 10. Valve 10 includes a spool 12 restrained at each end by end plugs 40. Spool 12 is moved to the left by solenoid 13 and to the right by solenoid 14. Pump pressure is supplied to valve 10 via pump 16 through passage 17. Control valve 10 includes a valve body 18 having a bore 20 passing therethrough. Intersecting bore 20 on opposite sides of pump passage 17 are motor port passages 22 and 24 which supply some motor function, not shown in the drawing. Also, intersecting bore 20 are a pair of exhaust or drain passages 26 and 28 which are jointed by a u-shaped passage 30. When neither solenoid is energized, valve spool 12 will return to its centered position due to the force of centering springs 32 and 33. Valve spool 12 is slidably positioned within bore 20 having lands 34, 35, 36 and 37.

Limiting the maximum travel of spool 12 are a pair of identical end plugs 40, which is the subject of the present invention. Plug 40, shown in detail in FIGS. 2, 3 and 4, includes a set of threads 41, at one end thereof for engagement and axial positioning with valve body 18. Located at the inner ends of threads 41 is an o-ring groove 42 for sealing plug 40 within the valve body 18. Passing through plug 40 is a bore 43 for receipt of the ends of valve spool 12. Located at the outer end of bore 43 is an inwardly projected flange 44 for restraining the travel of spool 12 in conjunction with solenoid core 49 or 50. Each solenoid core 49 or 50 includes a mating conical end surface surrounded by a flange 51 which extends outwardly and mates with plug flange 44, as shown in FIG. 1. Cores 49 and 50 are held in a stationary position by a nut, not shown, on the outer end of the core 50 which pulls flange 51 back against solenoid 13, holding plug 40 therebetween. Plug 40 has a hexagonal gripping surface 45, suitable for engagement by any type of wrench. Located at the thread end of hexagonal surface 45 is a circular undercut area 47 which leaves six contact points 46, which are best seen in FIGS. 2 and 4. Due to the angle of the undercut 47, the contact points 46 are tapered from a relatively small flat area at their tips to a larger cross-sectional area at their juncture with the center of the plug 40. As the plug is drawn against the valve surface 48, the tip of the contact points 46 deforms into its plastic range while the contact area increases with the amount of deformation. The amount of torque required to deform the points 46 also increases with the area increase. The Torque vs. Deflection curve in FIG. 6 illustrates that the particular cross section of the points 46 illustrated, allows an ample plastic deflection range C from point A to point B for the necessary tolerance adjustments required in the valves without exceeding the failure point of the points.

FIG. 5 is a modified form of the present invention wherein the plug 60 is utilized to set a relief valve spring 64 rather than to limit travel of the spool, as shown in the FIG. 1 embodiment. Plug 60 is similar to plug 40 of FIG. 3 with the exception of a closed-end spring cavity 66 which preloads relief spring 64 against relief valve element 65, thereby setting the relieving pressure level. Plug 60 includes six contact points 62 which are deformed against the harder surface 63 of the valve body 18, deforming the points until the proper relief valve setting is obtained. The plug 60, after it has been set, may be removed and reinstalled at a low factory-recommended torque value (elastic range), and the plug will be returned within a very small tolerance of its original setting since the elastic range is quite small, as for example 0.002 inches with the plug having an overall tolerance adjustment range of 0.045 inches.

OPERATION

During original assembly of the valves 10, the plugs 40 are torqued to a specified level, within the elastic range.

When setting valve 10, it is necessary that the opening between the right edge of spool land 35 and motor port 22 be sufficiently large to pass a certain flow rate required by the motor function. With valve 10 mounted on a test stand at the factory, solenoid 13 is energized. Solenoid core 50 immediately pulls valve spool 12 to the left with the conical end surfaces of the spool and core coming in contact, as seen in the FIG. 1 position. In this position, flow from pump 16 is passing through passage 17 and across spool land 35 into motor port 22 at a set rate. If the rate exceeds the desired value, the test stand operator applies additional torque to plug 40 screwing it further into valve body 18 deforming contact points 46. At any torque level below point A on the FIG. 6 curve, the contact points 46 are still in an elastic range. Once point A is exceeded on the curve, the contact points 46 are in the plastic deformation range. As additional torque is applied, plug 40 screws inwardly deforming contact points 46 until the proper flow rate is achieved across valve spool land 35, which could, for example, be point B on the FIG. 6 curve. Right hand plug 40 is then set in a similar manner after energizing solenoid 14.

Figure 7:
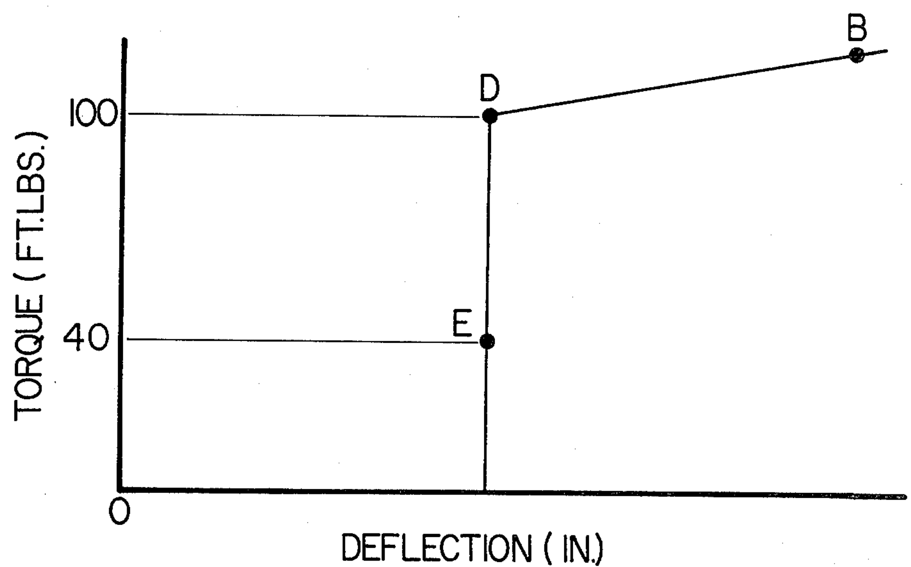
FIG. 7 is a curve plotting the torque required versus the deflection of the plug after it has been torqued into the plastic range, then removed and subsequently reinstalled.

Once in the field, plugs 40 and their respective solenoids can be removed and then properly reinstalled without calibrating the flow. This is achieved by replacing the plugs to a factory-recommended torque value (in the elastic range) which will be very close to the original factory setting. As for example, the installation torque might be 100 ft. lbs., as indicated by point D in FIG. 6, which is within the plastic deformation range of the contact points 46. When plug 40 is replaced in the field, it is set at 40 ft. lbs. of torque, as indicated by point E in the FIG. 7 curve. As can be seen on the curve, the deflection of point E is substantially the same as point D which is the same as point D on the FIG. 6 curve.

In the FIG. 5 embodiment, the pressure relieving level of the valve is set at the factory by screwing plug 60 sufficiently inward to achieve the proper compression on spring 64 necessary for the relief valve setting. The deformable points 62 likewise will deform within their plastic range to the particular setting. In the field, plug 60 can be removed and then replaced at a lower factory-recommended torque level such as indicated by point E in FIG. 7, which will produce a pressure relieving level substantially the same as the original setting.

Plugs 40 and 60 are made from a material such as an aluminum alloy, with the yield strength which is less than that of the material of the valve body so that the deformation occurs only on the plug and no damage is caused to the body. The permanent deformation of the plug allows a valve to be reassembled in the field and torqued to a factory-recommended level thereby eliminating the need for re-calibrating the valve on a test stand.

The contact points could also be shaped in a ring as a single point. While FIG. 5 defines element 65 as a relief valve, it also could be used in a valve spool detent structure.

Changes may be made in the construction and arrangement of the parts or elements of the embodiments as disclosed herein without departing from the spirit or scope of the invention as defined in the following claims.

I claim:

1. In a fluid control valve assembly including a valve element positioned in a bore in a valve body, the improvement comprising:

a plastically deformable plug means threadably received in said valve body for axial movement with respect to said bore;

stop means on the plug limiting axial movement of the valve element in said bore; and a deformable contact area on said plug means which comes in contact with the valve body as the plug is moved axially in said bore, said area deforming within its plastic range while providing sufficient axial movement of the plug means to set the flow rates of the valve element.

2. A fluid control valve assembly as set forth in claim 1, wherein the deformable contact area includes a plurality of contact points concentrically spaced around the periphery of the plug.

3. A fluid control valve assembly as set forth in claim 1, wherein the deformable contact area includes at least six contact points spaced around the outer periphery of the plug.

4. A fluid control valve assembly as set forth in claim 1, wherein the plug means includes a hexagonal gripping surface around its periphery and the deformable contact area comprises six contact points, each located adjacent a corner of the hexagonal gripping surface.

5. A fluid control valve assembly as set forth in claim 1, wherein the plug means includes an axial opening therethrough for passage of the valve element and the stop means comprises an inwardly projecting shoulder in the axial opening.

6. A fluid control valve assembly as set forth in claim 1, wherein the plug means includes a hexagonal gripping surface around its periphery and the deformable contact area comprises six contact points, each located adjacent a corner of the hexagonal gripping surface, and an axial opening in the plug means for passage of the valve element.

7. A fluid control valve assembly as set forth in claim 1, wherein the plug means includes a hexagonal gripping surface around its periphery and the deformable contact area comprises six contact points, each located adjacent a corner of the hexagonal gripping surface, with each contact point being formed by undercutting one end of the hexagonal gripping surface.

8. A fluid control valve assembly as set forth in claim 1, wherein the plug means includes a hexagonal gripping surface around its periphery and the deformable contact area comprises six contact points, each located adjacent a corner of the hexagonal gripping surface, the contact points each having a greater cross-sectional area in planes moving away from the plane of the contact area.

9. A fluid control valve assembly as set forth in claim 1, wherein the plug means includes a hexagonal gripping surface around its periphery and the deformable contact area comprises six contact points, each located adjacent a corner of the hexagonal gripping surface, the contact points each being tapered outward from the contact area.

10. A fluid control valve assembly as set forth in claim 1, wherein the plug is made of a material with a yield strength which is less than that of the valve body.

11. A fluid control valve assembly as set forth in claim 1, wherein the plug means includes a gripping surface around its periphery.

* * * * *